(12) United States Patent  
Kuroki et al.

(10) Patent No.: US 6,208,566 B1
(45) Date of Patent: Mar. 27, 2001

(54) SEMICONDUCTOR INTEGRATED CIRCUIT (75) Inventors: Osamu Kuroki; Masakuni Kawagoe, both of Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/261,118

(22) Filed: Mar. 3, 1999

(30) Foreign Application Priority Data

Apr. 28, 1998 (JP) .................................................. 10-118758
Jul. 17, 1998 (JP) .................................................. 10-203441

(51) Int. Cl.$^7$ ...................................................... G11C 7/00
(52) U.S. Cl. ...................... 365/191; 365/221; 365/189.05
(58) Field of Search .............................. 365/221, 189.05, 365/191, 206, 189.09, 189.06

(56) References Cited

U.S. PATENT DOCUMENTS 5,148,399 * 9/1992 Cho ........................................ 365/205
5,361,236 * 11/1994 Iwakiri .................................. 365/221

FOREIGN PATENT DOCUMENTS 3-25791   2/1991  (JP) .
5-155374  7/1993  (JP) .
7-65569   3/1995  (JP) .

* cited by examiner

*Primary Examiner*—A. Zarabian
(74) *Attorney, Agent, or Firm*—Jones Volentine, L.L.C.

(57) ABSTRACT

A first data store circuit is coupled to first and second voltage nodes of first and second voltage levels, respectively, and a control circuit outputs a transfer signal and a switching signal. A data transfer circuit is coupled between the first data store circuit and a second data store circuit and selectively transfers the data in the first data store circuit to the second data store circuit in response to the transfer signal. A first conductive line supplies the first voltage level to the second data store circuit and a second conductive line supplies the second voltage level to the second data store circuit. A first switch circuit is coupled between the second voltage node and the second conductive line and selectively connects the second voltage node to the second conductive line in response to the switching signal. Also a resistive element is coupled between the second conductive line and the first voltage node.

21 Claims, 8 Drawing Sheets

SEMICONDUCTOR INTEGRATED CIRCUIT

BACKGROUND OF THE INVENTION

1. Field of the Invention

The present invention generally relates to a semiconductor integrated circuit, more particularly, to the semiconductor integrated circuit having a read register and a write register. Such registers are employed in a FIFO (First In First Out) memory and in a VRAM (Video Random Access Memory).

This application is a counterpart of Japanese patent applications, Serial Number 0118758/1998, filed Apr. 28, 1998 and Serial Number 0203441/1998, filed Jul. 17, 1998, the subject matter of which are incorporated herein by reference.

2. Description of the Related Art

A conventional technique is described in Japanese Laid Open Patent Application No. 07-65569. This patent application discloses a semiconductor integrated circuit having a read register and a write register, each of the registers being comprised of two inverters. A data stored in the write register is transferred to the read register through a transmission gate.

However, the patent application does not describe the relationship between the drive capacity of the inverter in the read register and the drive capacity of the inverter in the write register. If the drive capacity of the inverter in the read register is larger than that of the inverter in the write register, there is a possibility that the data transferred from the write register is inverted by the read register. Consequently, there has been a need for an improved semiconductor integrated circuit.

SUMMARY OF THE INVENTION

It is an object of the present invention is to provide a semiconductor integrated circuit that ensures accurate data transfer.

It is another object of the present invention is to provide a semiconductor integrated circuit that reduces power consumption.

According to one aspect of the present invention, for achieving the above object, there is provided a semiconductor integrated circuit that includes a first voltage node of a first voltage level, a second voltage node of a second voltage level, a first data store circuit coupled to the first and second voltage nodes and which stores a data, and a second data store circuit. The semiconductor integrated circuit further includes a control circuit which outputs a transfer signal and a switching signal, a data transfer circuit coupled between the first data store circuit and the second data store circuit and which selectively transfers the data in the first data store circuit to the second data store circuit in response to the transfer signal, a first conductive line which supplies the first voltage level to the second data store circuit and a second conductive line which supplies the second voltage level to the second data store circuit. The semiconductor integrated circuit also includes a first switch circuit coupled between the second voltage node and the second conductive line and which selectively connects the second voltage node to the second conductive line in response to the switching signal and a resistive element coupled between the second conductive line and the first voltage node.

The above and further objects and novel features of the invention Will more fully appear from the following detailed description, appended claims and the accompanying drawings.

DETAILED DESCRIPTION OF THE PREFERRED EMBODIMENTS

First Embodiment

A semiconductor integrated circuit according to the present invention will be explained hereinafter with reference to the figures.

Figure 1:
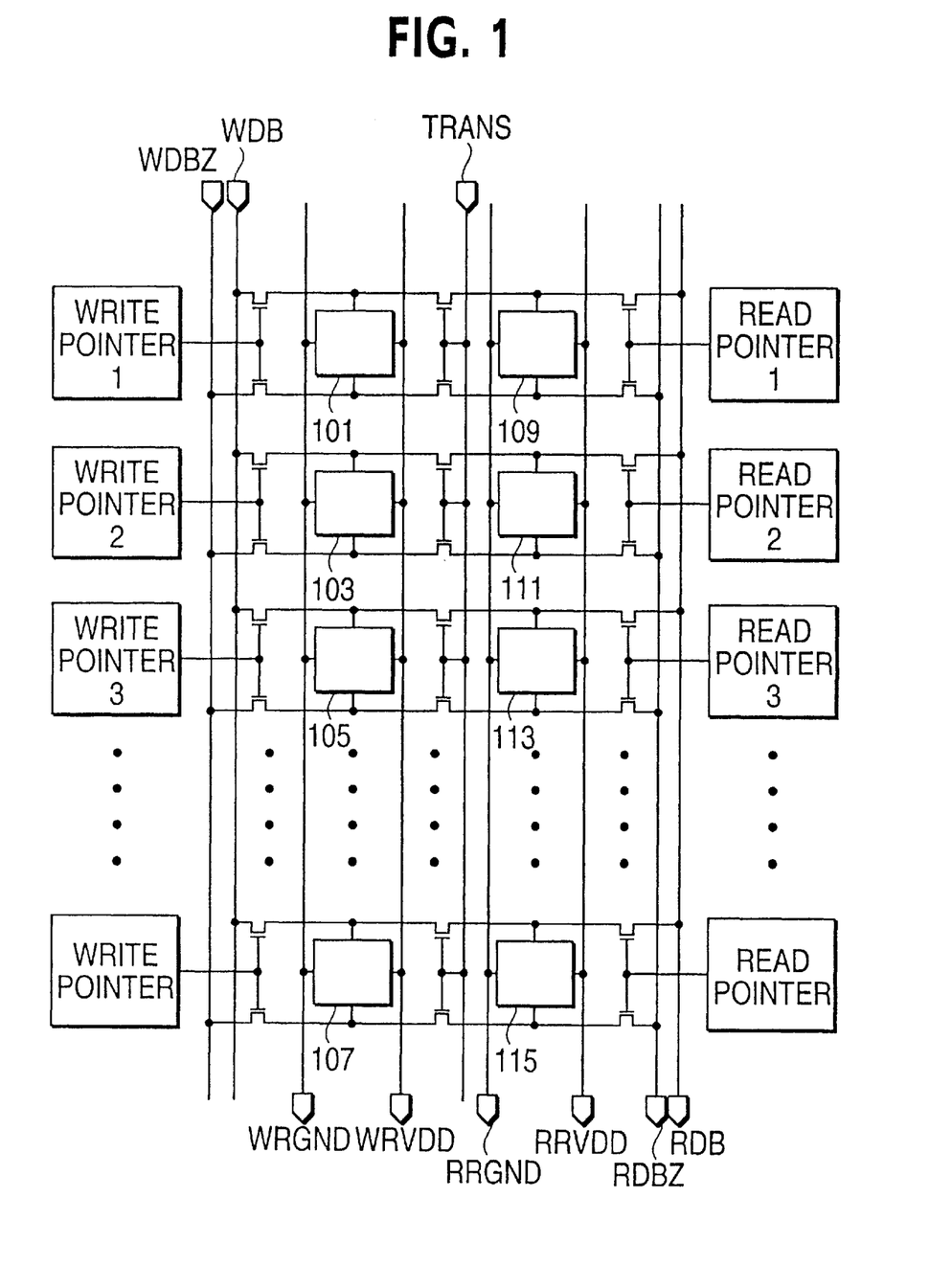
FIG. 1 is a block diagram showing a semiconductor integrated circuit which includes registers.

FIG. 1 is a block diagram showing a semiconductor integrated circuit which includes a write register and a read register. The semiconductor integrated circuit as shown in FIG. 1 is used for memory circuit such as a FIFO memory and a VRAM.

The write registers 101, 103, 105 and 107 are connected to a voltage supply line WRVDD for the write register and a voltage supply line WRGND for the write register. The voltage supply line WRVDD is directly connected to a voltage source VDD which supplies a potential of 5 volts, for example. The voltage supply line WRGND is directly connected to a voltage source GND which supplies a potential of 0 volts, for example.

Figure 5:
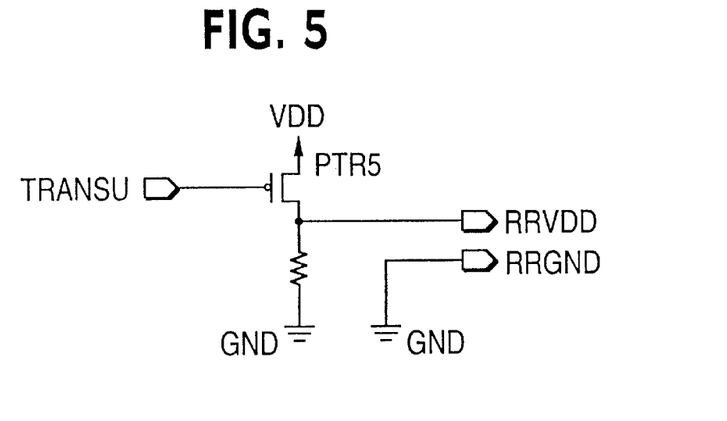
FIG. 5 is a circuit diagram showing a supply potential transfer circuit of the first preferred embodiment.

The read registers 109, 111, 113 and 115 are connected to a voltage supply line RRVDD for the read register and a voltage supply line RRGND for the read register. The voltage supply line RRVDD is connected to elements shown in FIG. 5. The voltage supply line RRGND is directly connected to the voltage source GND, as also shown in FIG. 5. The circuit of FIG. 5 will be explained later.

First transfer gates are connected between write data buses WDB and WDBZ and the write registers respectively. The first transfer gate is comprised of transistors, each of which has a gate electrode receiving an output of a write pointer. The second transfer gates are connected between read data buses RDB and RDBZ and the read registers respectively. The second transfer gate is comprised of transistors, each of which has a gate electrode receiving an output of a read pointer.

Third transfer gates are connected between the write registers and the read registers. The third transfer gate is comprised of transistors, each of which has a gate electrode receiving a data transfer signal TRANS. The third transfer gate is controlled by the data transfer signal TRANS.

Figure 2:
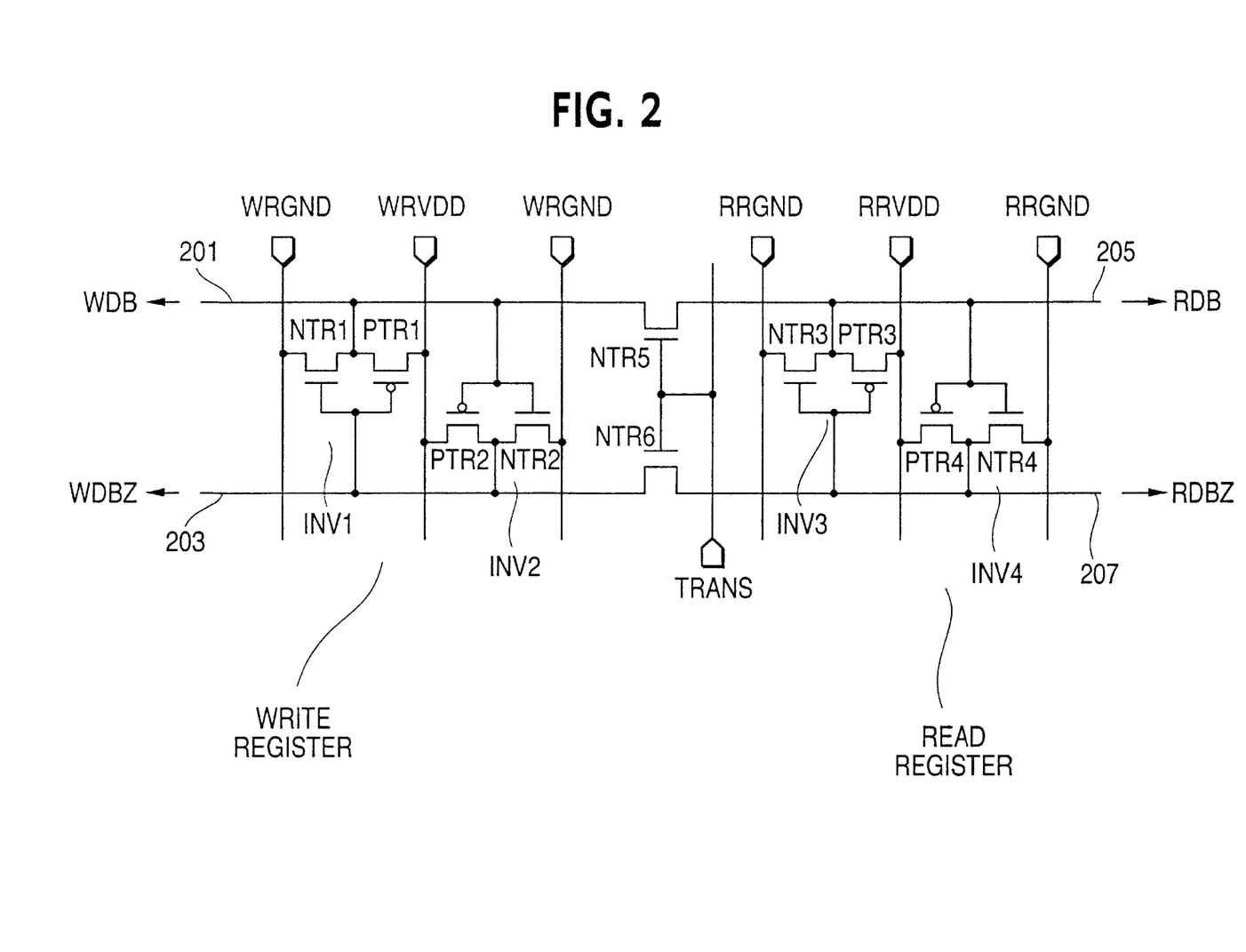
FIG. 2 is a circuit diagram of read and write registers.

FIG. 2 is a detailed circuit diagram showing the write register and the read register. The write register is comprised of inverters INV1 and INV2. The inverter INV1 is comprised of an NMOS transistor NTR1 and a PMOS transistor PTR1. The inverter INV2 is comprised of an NMOS transistor NTR2 and a PMOS transistor PTR2. An input terminal of the inverter INV1 and an output terminal of the inverter INV2 are commonly connected to a line 203 which is to be coupled to the write data bus WDBZ. An output terminal of the inverter INV1 and an input terminal of the inverter INV2 are commonly connected to a line 201 which is to be coupled to the write data bus WDB. Source electrodes of PMOS transistors PTR1 and PTR2 are connected to the voltage supply line WRVDD. Source electrodes of NMOS transistors NTR1 and NTR2 are connected to the voltage supply line WRGND.

The read register is comprised of inverters INV3 and INV4. The inverter INV3 is comprised of an NMOS transistor NTR3 and a PMOS transistor PTR3. The inverter INV4 is comprised of an NMOS transistor NTR4 and a PMOS transistor PTR4. An input terminal of the inverter INV3 and an output terminal of the inverter INV4 are commonly connected to a line 207 which is to be coupled to the read data bus RDBZ. An output terminal of the inverter INV3 and an input terminal of the inverter INV4 are commonly connected to a line 205 which is to be coupled to the read data bus RDB. Source electrodes of PMOS transistors PTR3 and PTR4 are connected to the voltage supply line RRVDD. Source electrodes of NMOS transistors NTR3 and NTR4 are connected to the voltage supply line RRGND. The third transfer gate is comprised of NMOS transistors NTR5 and NTR6. The NMOS transistors NTR5 and NTR6 are connected between the write register and the read register.

Figure 3:
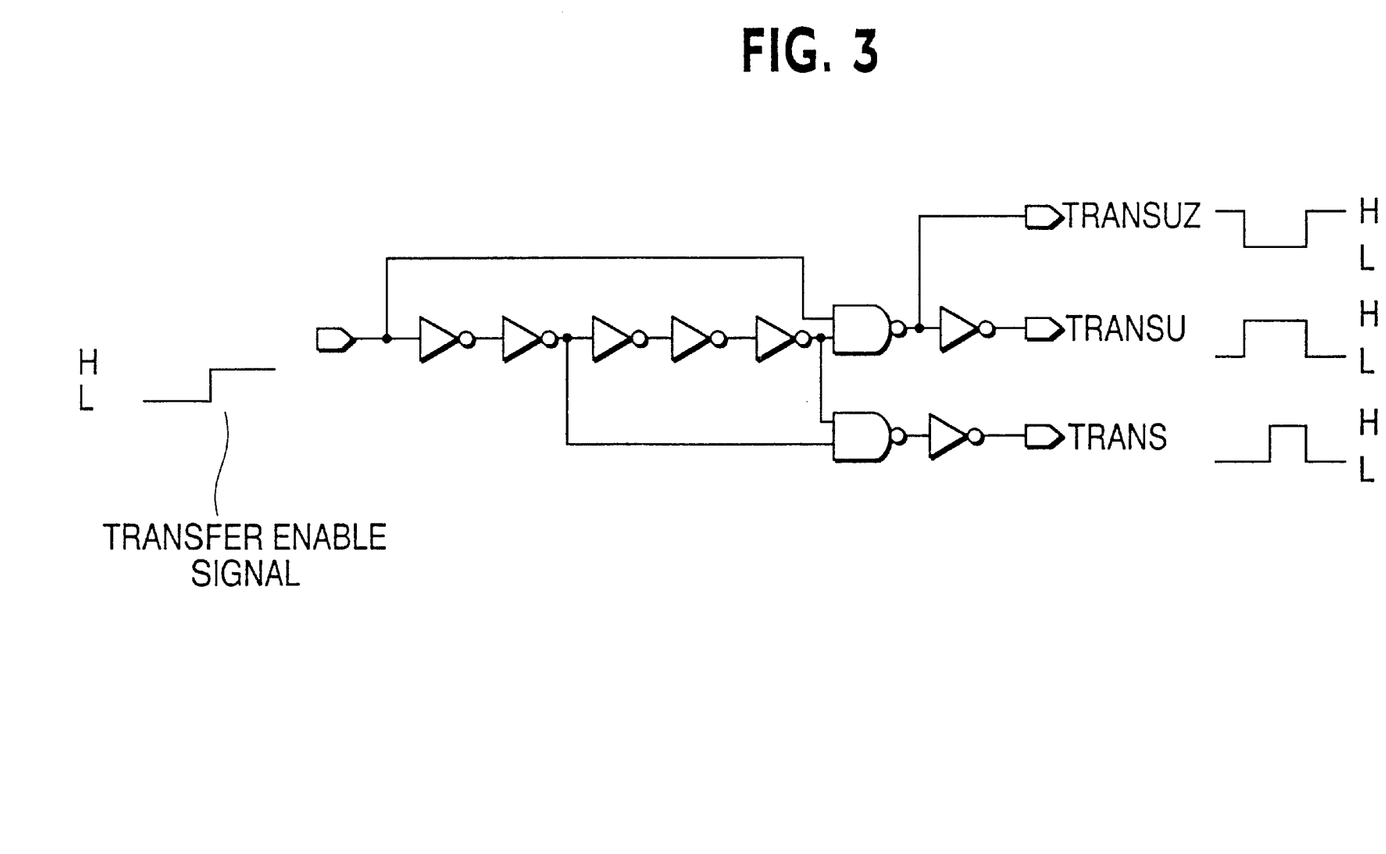
FIG. 3 is a circuit diagram of a transfer control circuit.

FIG. 3 is a circuit diagram showing a transfer control circuit. The transfer control circuit produces the data transfer signal TRANS, a control signal TRANSU and a control signal TRANSUZ in response to a transfer enable signal. The control signals TRANSU, TRANSUZ are used to control a supply potential transfer circuit which supplies a potential to the register. The supply potential transfer circuit will be explained later. The transfer control circuit outputs the control signal TRANSUZ having a high level (hereinafter "H" level), the control signal TRANSU having a low level (hereinafter "L" level) and the data transfer signal TRANS having the L level while the transfer control circuit receives the transfer enable signal having the L level. When the transfer enable signal changes from the L level to the H level, the transfer control circuit outputs the control signal TRANSUZ having the L level and the control signal TRANSU having the H level in accordance with the delay time depending upon delay circuits which are comprised of a plurality of inverters as shown in FIG. 3. The time period in which the control signal TRANSUZ is the L level and the time period in which the control signal TRANSU is the H level are substantially the same. The time period in which the data transfer signal TRANS is the H level is the end portion of the H level of the control signal TRANSU.

FIG. 5 is a circuit diagram showing a supply potential transfer circuit for the read register. The voltage supply line RRGND is directly connected to the voltage source GND. A PMOS transistor PTR5 is connected between the voltage supply line RRVDD and the voltage source VDD. The PMOS transistor PTR5 is controlled by the control signal TRANSU. A resistor having high resistance (or resistivity) is connected between the voltage supply line RRVDD and the voltage source GND.

Next, the operation of the first preferred embodiment will be explained hereinafter.

The write data is supplied to the write data buses WDB, WDBZ. For example, the H level is supplied to the write data bus WDB and the L level is supplied to the write data bus WDBZ. When the write pointer 1 outputs the H level, the first transfer gate enters an ON state. Therefore, the data supplied to the write data buses WDB, WDBZ is transferred to the write register 101. The write register 101 latches the H level applied to the line 201 and the L level applied to the line 203. That is, the data supplied to the write data buses WDB, WDBZ is written into the write register 101.

After the write pointer 1 outputs the H level, the write pointer 1 outputs the L level. When the write pointer 1 outputs the L level, the first transfer gate enters an OFF state. Therefore the data transfer operation from the data buses WDB, WDBZ to the write register 101 terminates.

Next, new write data is supplied to the write data buses WDB, WDBZ. For example, the L level is supplied to the write data bus WDB and the H level is supplied to the write data bus WDBZ. When the write pointer 2 outputs the H level, the first transfer gate enters an ON state. Therefore, the data supplied to the write data buses WDB, WDBZ is transferred to the write register 103. The write register 103 latches the L level applied to the line 201 and the H level applied to the line 203. That is, the data supplied to the write data buses WDB, WDBZ is written into the write register 103.

After the write pointer 2 outputs the H level, the write pointer 2 outputs the L level. When the write pointer 2 outputs the L level, the first transfer gate enters an OFF state. Therefore the data transfer operation from the data buses WDB, WDBZ to the write register 103 terminates.

The operations described above are repeated with respect to the write registers 101 to 107.

After such data transfer operations, the transfer enable signal changes from the L level to the H level. When the transfer enable signal becomes the H level, the control signal TRANSU becomes the H level during a certain period. The transistor PTR5 enters an OFF state while the control signal TRANSU is the H level. Since the voltage supply line RRVDD is connected to the voltage source GND through the resistor having high resistance (or resistivity), the approximate VDD level of the voltage supply line RRVDD drops slowly toward the GND level while the transistor PTR5 is in an OFF state. The drive capacities of the inverters INV3, INV4 substantially decrease because the potential level of the voltage supply line RRVDD decreases.

After the control signal TRANSU goes to the H level, the data transfer signal TRANS becomes the H level. When the data transfer signal TRANS becomes the H level, the transistors NTR5, NTR6 enter the ON state. Therefore, the line 201 is electrically connected to the line 205 and the line 203 is electrically connected to the line 207. Now, since the potential level of the voltage supply line RRVDD is lower than before, the drive capacities of the inverters INV3, INV4 are lower than those of inverters INV1, INV2. Therefore, the potential level of the line 205 can be easily changed by the potential level of the line 201. The potential level of the line 207 can be also easily changed by the potential level of the line 203. That is, this means that the data stored in the write register can be accurately written into the read register.

Next, the control signal TRANSU and the data transfer signal TRANS change from the H level to the L level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR5 enter the ON state. Therefore, the potential level of the voltage supply line RRVDD rises to about the VDD level. Since the potential level of the voltage supply line RRVDD becomes the VDD level, the drive capacity of the inverters INV3, INV4 are recovered. Consequently, the read register can accurately latch the data transferred from the write register.

Figure 4:
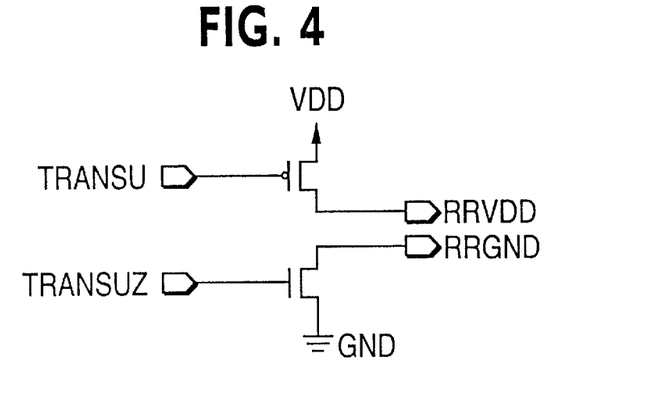
FIG. 4 is a reference circuit diagram of a supply potential transfer circuit.

FIG. 4 is a circuit diagram showing the related art of the present invention. In order to clarify advantages of the present invention, the related art which is shown in FIG. 4 will be explained hereinafter.

The related art has a PMOS transistor connected between the voltage supply line RRVDD and the voltage source VDD. The PMOS transistor is controlled by the control signal TRANSU. The related art also has an NMOS transistor connected between the voltage supply line RRGND and the voltage source GND. The NMOS transistor is controlled by the control signal TRANSUZ. In the case of the related art, these transistors are in the OFF state while the data stored in the write register is transferring to the read register. In the case of the related art, the voltage supply line RRVDD and the voltage supply line RRGND become a floating state during such data transfer. As a result, when noise is applied to the voltage supply line, there is a possibility that the potential level of the voltage supply line RRVDD goes to a potential level which is higher than the VDD level. If the potential level of the voltage supply line RRVDD exceeds the VDD level, the drive capacity of the read register becomes larger than that of the write register. Therefore, there is a possibility that the data transferred from the write register is changed by the read register.

In the present invention, since the drive capacity of the read register becomes lower than that of the write register only while such data transfer operation is executed, the data transferred from the write register is not changed by the read register. Therefore, an accurate data transfer can be executed.

Second Embodiment

A semiconductor integrated circuit according to the second preferred embodiment will be explained hereinafter. The difference between the second preferred embodiment and the first preferred embodiment resides in the circuit structure of the supply potential transfer circuit for the read register.

Figure 6:
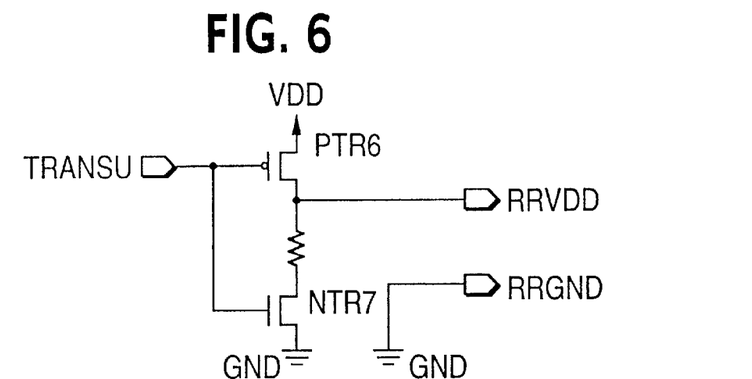
FIG. 6 is a circuit diagram showing a supply potential transfer circuit of the second preferred embodiment.

FIG. 6 is a circuit diagram showing a supply potential transfer circuit for the read register, according to the second preferred embodiment. As explained above, the voltage supply line RRGND is directly connected to the voltage source GND. A PMOS transistor PTR6 is connected between the voltage supply line RRVDD and the voltage source VDD. The PMOS transistor PTR6 is controlled by the control signal TRANSU. A resistor having high resistance (or resistivity) and an NMOS transistor NTR7 which is controlled by the control signal TRANSU are connected in series between the voltage supply line RRVDD and the voltage source GND. The supply potential transfer circuit is controlled by the output of the transfer control circuit as shown in FIG. 3.

Next, the operation of the second preferred embodiment will be explained hereinafter.

When the transfer enable signal changes from the L level to the H level, the control signal TRANSU is the H level during a certain period. The transistor PTR6 enters the OFF state and the transistor NTR7 enters the ON state when the control signal TRANSU becomes the H level. Since the voltage supply line RRVDD is connected to the voltage source GND through the resistor having high resistance (or resistivity) and the transistor NTR7, the approximate VDD level of the voltage supply line RRVDD drops slowly toward the GND level. The drive capacities of the inverters INV3, INV4 are substantially decreased because the potential level of the voltage supply line RRVDD decreases.

After the control signal TRANSU goes to the H level, the data transfer signal TRANS becomes the H level. When the data transfer signal TRANS becomes the H level, the transistors NTR5, NTR6 enter the ON state. Therefore, the line 201 is electrically connected to the line 205 and the line 203 is electrically connected to the line 207. Now, since the potential level of the voltage supply line RRVDD is lower than before, the drive capacities of the inverters INV3, INV4 are lower than those of inverters INV1, INV2. Therefore, the potential level of the line 205 can be easily changed by the potential level of the line 201. The potential level of the line 207 can be also easily changed by the potential level of the line 203. That is, this means that the data in the write register can be accurately written into the read register.

Next, the control signal TRANSU and the data transfer signal TRANS change from the H level to the L level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR6 enters the ON state and the transistor NTR7 enters the OFF state. Therefore, the potential level of the voltage supply line RRVDD rises about VDD level. Since the potential level of the voltage supply line RRVDD becomes the VDD level, the drive capacity of the inverters INV3, INV4 are recovered. Consequently, the read register can accurately latch the data transferred from the write register.

In the present invention, since the drive capacity of the read register becomes lower than that of the write register only when such data transfer operation is executed, the data transferred from the write register is not changed by the read register. Therefore, an accurate data transfer can be executed.

Furthermore, in the second preferred embodiment, the voltage supply line RRVDD is electrically connected to the voltage source GND through the resistor only when such data transfer operation is executed. That is, there is no current flowing from the voltage source VDD to the voltage source GND in the time period other than such data transfer. Therefore, the second preferred embodiment can reduce the power consumption, in addition to achieving accurate data transfer.

Third Embodiment

A semiconductor integrated circuit according to the third preferred embodiment will be explained hereinafter. The difference between the third preferred embodiment and the first preferred embodiment resides in the circuit structure of the supply potential transfer circuit for the read register.

Figure 7:
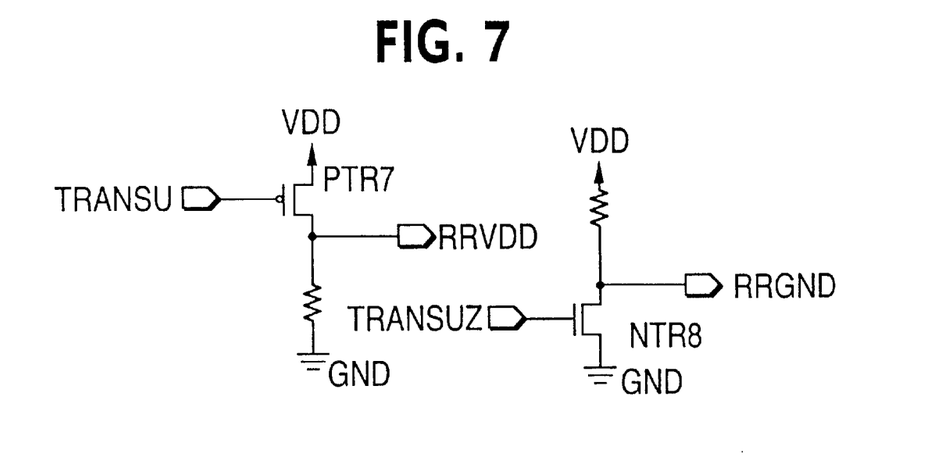
FIG. 7 is a circuit diagram showing a supply potential transfer circuit of the third preferred embodiment.

FIG. 7 is a circuit diagram showing a supply potential transfer circuit for the read register, according to the third preferred embodiment. A PMOS transistor PTR7 is connected between the voltage supply line RRVDD and the voltage source VDD. The PMOS transistor PTR7 is controlled by the control signal TRANSU. A resistor having high resistance (or resistivity) is connected between the voltage supply line RRVDD and the voltage source GND. A NMOS transistor NTR8 is connected between the voltage supply line RRGND and the voltage source GND. The NMOS transistor NTR8 is controlled by the control signal TRANSUZ. A resistor having high resistance (or resistivity) is connected between the voltage supply line RRGND and the voltage source VDD. The supply potential transfer circuit is controlled by the output of the transfer control circuit as shown in FIG. 3.

Next, the operation of the third preferred embodiment will be explained hereinafter.

When the transfer enable signal changes from the L level to the H level, the control signal TRANSU becomes the H level and the control signal TRANSUZ becomes the L level during a certain period.

The transistor PTR7 enters the OFF state and the transistor NTR8 enters the OFF state when the control signal TRANSU becomes the H level and the control signal TRANSUZ becomes the L level. Since the voltage supply line RRVDD is connected to the voltage source GND through the resistor having high resistance (or resistivity), the approximate VDD level of the voltage supply line RRVDD drops slowly toward the GND level. Since the voltage supply line RRGND is connected to the voltage source VDD through the resistor having high resistance (or resistivity), the approximate GND level of the voltage supply line RRGND rises slowly toward the VDD level. The drive capacities of the inverters INV3, INV4 are substantially decreased because the potential level of the voltage supply line RRVDD decreases and the potential level of the supply voltage line RRGND increases.

After the control signal TRANSU goes to the H level, the data transfer signal TRANS becomes the H level. When the data transfer signal TRANS becomes the H level, the transistors NTR5, NTR6 enter the ON state. Therefore, the line 201 is electrically connected to the line 205 and the line 203 is electrically connected to the line 207. Now, since the potential level of the voltage supply line RRVDD is lower than before and the potential level of the voltage supply line RRGND is higher than before, the drive capacities of the inverters INV3, INV4 are lower than those of inverters INV1, INV2. Therefore, the potential level of the line 205 can be easily changed by the potential level of the line 201. The potential level of the line 207 can be also easily changed by the potential level of the line 203. That is, this means that the data in the write register can be accurately written into the read register.

Next, the control signal TRANSU and the data transfer signal TRANS change from the H level to the L level and the control signal TRANSUZ changes from the L level to the H level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR7 enters the ON state. Therefore, the potential level of the voltage supply line RRVDD rises to about the VDD level. When the control signal TRANSUZ becomes the H level, the transistor NTR8 enters the ON state. Therefore, the potential level of the voltage supply line RRGND falls to the GND level. Since the potential level of the voltage supply line RRVDD becomes VDD level and the potential level of the voltage supply line RRGND becomes GND level, the drive capacities of the inverters INV3, INV4 are recovered. Consequently, the read register can accurately latch the data transferred from the write register.

In the present invention, since the drive capacity of the read register becomes lower than that of the write register only while such data transfer operation is executed, the data transferred from the write register is not changed by the read register. Therefore, an accurate data transfer can be executed.

Furthermore, compared with the first preferred embodiment, the third preferred embodiment can transfer the data more accurately because both of the potential levels of the voltage supply line RRVDD and the RRGND for the read register are changed during the data transfer.

Fourth Embodiment

A semiconductor integrated circuit according to the fourth preferred embodiment will be explained hereinafter. The difference between the fourth preferred embodiment and the second preferred embodiment resides in the circuit structure of the supply potential transfer circuit for the read register.

Figure 8:
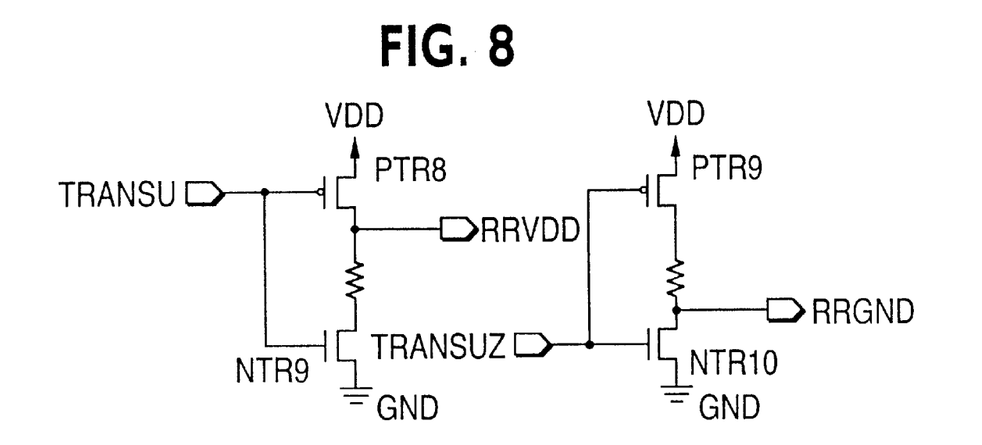
FIG. 8 is a circuit diagram showing a supply potential transfer circuit of the fourth preferred embodiment.

FIG. 8 is a circuit diagram showing a supply potential transfer circuit for the read register, according to the fourth preferred embodiment. A PMOS transistor PTR8 is connected between the voltage supply line RRVDD and the voltage source VDD. The PMOS transistor PTR8 is controlled by the control signal TRANSU. A resistor having high resistance (or resistivity) and an NMOS transistor NTR9 which is controlled by the control signal TRANSU are connected in series between the voltage supply line RRVDD and the voltage source GND. An NMOS transistor NTR10 is connected between the voltage supply line RRGND and the voltage source GND. The NMOS transistor NTR10 is controlled by the control signal TRANSUZ. A resistor having high resistance (or resistivity) and a PMOS transistor PTR9 which is controlled by the control signal TRANSUZ are connected in series between the voltage supply line RRGND and the voltage source VDD. The supply potential transfer circuit is controlled by the output of the transfer control circuit as shown in FIG. 3.

Next, the operation of the fourth preferred embodiment will be explained hereinafter.

When the transfer enable signal changes from the L level to the H level, the control signal TRANSU becomes the H level and the control signal TRANSUZ becomes the L level during a certain period. The transistor PTR8 enters the OFF state and the transistor NTR9 enters the ON state when the control signal TRANSU becomes the H level. Since the voltage supply line RRVDD is connected to the voltage source GND through the resistor having high resistance (or resistivity) and the transistor NTR9, the approximate VDD level of the voltage supply line RRVDD drops slowly toward the GND level. The transistor PTR9 enters the ON state and the transistor NTR10 enters the OFF state when the control signal TRANSUZ becomes the L level. Since the voltage supply line RRGND is connected to the voltage source VDD through the resistor having high resistance (or resistivity) and the transistor PTR9, the approximate GND level of the voltage supply line RRGND rises slowly toward the VDD level.

The drive capacities of the inverters INV3, INV4 are substantially decreased because the potential level of the voltage supply line RRVDD falls and the potential level of the voltage supply line RRGND rises.

After the control signal TRANSU goes to the H level, the data transfer signal TRANS becomes the H level. When the data transfer signal TRANS becomes the H level, the transistors NTR5, NTR6 enter the ON state. Therefore, the line 201 is electrically connected to the line 205 and the line 203 is electrically connected to the line 207.

Now, since the potential level of the voltage supply line RRVDD is lower than before and the potential level of the voltage supply line RRGND is higher than before, the drive capacities of the inverters INV3, INV4 are lower than that of inverters INV1, INV2. Therefore, the potential level of the line 205 can be easily changed by the potential level of the line 201. The potential level of the line 207 can be also easily changed by the potential level of the line 203. That is, this means that the data in the write register can be accurately written into the read register.

Next, the control signal TRANSU and the data transfer signal TRANS change from the H level to the L level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR8 enters the ON state and the transistor NTR9 enters the OFF state. Therefore, the potential level of the voltage supply line RRVDD rises to about the VDD level. When the control signal TRANSUZ becomes the H level, the transistor PTR9 enters the OFF state and the transistor NTR10 enters the ON state. Therefore, the potential level of the voltage supply line RRGND falls to about the GND level.

Since the potential level of the voltage supply line RRVDD becomes the VDD level and the potential level of the voltage supply line RRGND becomes the GND level, the drive capacities of the inverters INV3, INV4 are recovered. Consequently, the read register can accurately latch the data transferred from the write register.

In the present invention, since the drive capacity of the read register becomes lower than that of the write register only while such data transfer operation is executed, the data transferred from the write register is not changed by the read register. Therefore, an accurate data transfer can be executed.

Furthermore, in the fourth preferred embodiment, the voltage supply line RRVDD is electrically connected to the voltage source GND through the resistor only when such data transfer operation is executed. The voltage supply line RRGND is electrically connected to the voltage source VDD through the resistor only when such data transfer operation is executed. That is, there is no current flowing from the voltage source VDD to the voltage source GND in the time period other than such data transfer. Therefore, the fourth preferred embodiment can reduce the power consumption, in addition to achieving accurate data transfer.

Fifth Embodiment

A semiconductor integrated circuit according to the fifth preferred embodiment will be explained hereinafter. The difference between the fifth preferred embodiment and the first preferred embodiment resides in the circuit structures of the supply potential transfer circuit for the read register and the transfer control circuit.

Figure 9:
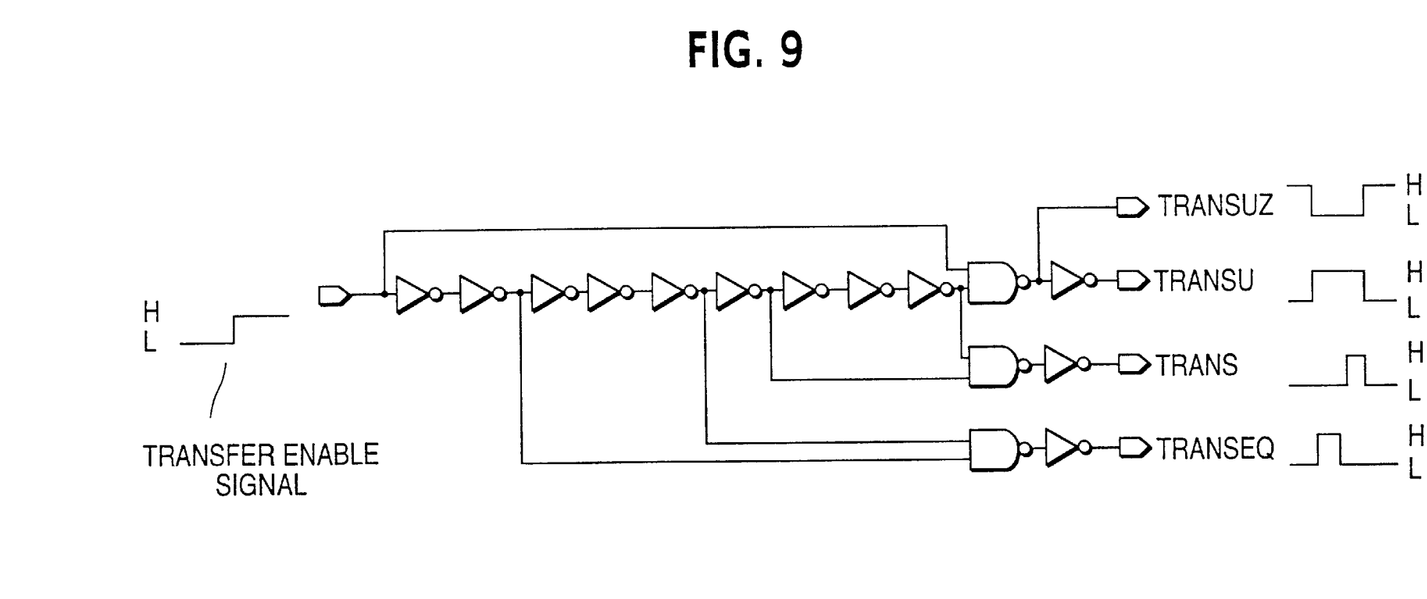
FIG. 9 is a circuit diagram showing a transfer control circuit of the fifth preferred embodiment.

FIG. 9 is a circuit diagram showing a transfer control circuit. The transfer control circuit produces the data transfer signal TRANS, a control signal TRANSU, a control signal TRANSUZ and a equalize control signal TRANSEQ in response to a transfer enable signal. The control signals TRANSU, TRANSUZ are used to control a supply potential transfer circuit which supplies a potential to the register. The supply potential transfer circuit will be explained after.

The transfer control circuit outputs the control signal TRANSUZ having the H level, the control signal TRANSU having the L level, the data transfer signal TRANS having the L level and the equalize control signal TRANSEQ having the L level while the transfer control circuit receives the transfer enable signal having the L level. When the transfer enable signal changes from the L level to the H level, the transfer control circuit outputs the control signal TRANSUZ having the L level, the control signal TRANSU having the H level, the data transfer signal TRANS having the H level and the equalize control signal having the H level in accordance with the delay time which depends upon delay circuits which are comprised of a plurality of inverters as shown in FIG. 9. The time period in which the control signal TRANSUZ is the L level and the time period in which the control signal TRANSU is the H level are substantially the same. The time period in which the data transfer signal TRANS is the H level is the end portion of the H level of the control signal TRANSU. The time period in which the equalize control signal TRASEQ is the H level is just before the H level of the data transfer signal TRANS.

Figure 10:
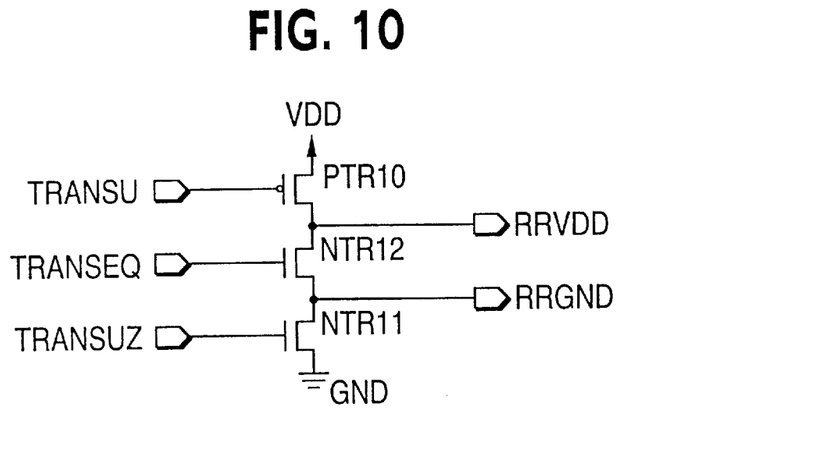
FIG. 10 is a circuit diagram showing a supply potential transfer circuit of the fifth preferred embodiment.

FIG. 10 is a circuit diagram showing a supply potential transfer circuit for the read register, according to the fifth preferred embodiment. A PMOS transistor PTR10 is connected between the voltage supply line RRVDD and the voltage source VDD. The PMOS transistor PTR10 is controlled by the control signal TRANSU. An NMOS transistor NTR11 is connected between the voltage supply line RRGND and the voltage source GND. The NMOS transistor NTR11 is controlled by the control signal TRANSUZ. An NMOS transistor NTR12 is connected between the voltage supply line RRVDD and the voltage supply line RRGND. The NMOS transistor NTR12 is controlled by the equalize control signal TRANSEQ. The supply potential transfer circuit is controlled by the output of the transfer control circuit as shown in FIG. 9.

Next, the operation of the fifth preferred embodiment will be explained hereinafter.

When the transfer enable signal changes from the L level to the H level, the control signal TRANSU becomes the H level and the control signal TRANSUZ becomes the L level during a certain period. The transistor PTR10 enters the OFF state when the control signal TRANSU becomes the H level. The transistor NTR11 enters the OFF state when the control signal TRANSUZ becomes the L level.

After the transistors PTR10 and NTR11 are in the OFF state, the equalize control signal TRANSEQ changes from the L level to the H level. Since the equalize control signal TRANSEQ goes to the H level, the voltage supply line RRVDD is electrically connected to the voltage supply line RRGND. As a result, the potential levels of the voltage supply lines RRVDD and RRGND become the same level. In this time, the potential level of that is about ½ VDD level. This level is the threshold voltage level of the inverters INV3 and INV4.

The inverters INV3 and INV4 become a substantially inactive state because the potential level of the voltage supply line RRVDD is equal to the potential level of the voltage supply line RRGND.

Next, the equalize control signal TRANSEQ changes from the H level to the L level and the data transfer signal TRANS changes from the L level to the H level. When the data transfer signal TRANS becomes the H level, the transistors NTR5, NTR6 enter the ON state. Therefore, the line 201 is electrically connected to the line 205 and the line 203 is electrically connected to the line 207.

Now, since the potential level of the voltage supply line RRVDD is equal to that of the voltage supply line RRGND, the inverters INV3, INV4 are in the inactive state. Therefore, the potential level of the line 205 can be easily changed by the potential level of the line 201. The potential level of the line 207 can be also easily changed by the potential level of the line 203. That is, this means that the data in the write register can be transferred to the line 205 and 207 rapidly and accurately.

Next, the control signal TRANSU and the data transfer signal TRANS change from the H level to the L level and the control signal TRANSUZ changes from the L level to the H level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR10 enters the ON state. Therefore, the potential level of the voltage supply line RRVDD rises to about the VDD level. When the control signal TRANSUZ becomes the H level, the transistor NTR11 enters the ON state. Therefore, the potential level of the voltage supply line RRGND falls to about the GND level.

Since the potential level of the voltage supply line RRVDD becomes the VDD level and the potential level of the voltage supply line RRGND becomes the GND level, the state of the inverters INV3, INV4 are recovered to the active state. Consequently, the read register can accurately latch the data transferred from the write register.

In the present invention, since the data stored in the write register is transferred to the lines 205 and 207 while the inverters INV3 and INV4 are in the inactive states, a faster data transfer can be executed, compared with the first through fourth preferred embodiments.

Furthermore, in the fifth preferred embodiment, since a resistor having high resistance (or resistivity) is not used in the supply potential transfer circuit, it is possible to reduce the area in which the supply potential transfer circuit is produced. Furthermore, it is not easily influenced by process errors which occur when such a resistor is produced.

Sixth Embodiment

A semiconductor integrated circuit according to the sixth preferred embodiment will be explained hereinafter. The difference between the sixth preferred embodiment and the fifth preferred embodiment resides in the circuit structures of the supply potential transfer circuit for the read register.

Figure 11:
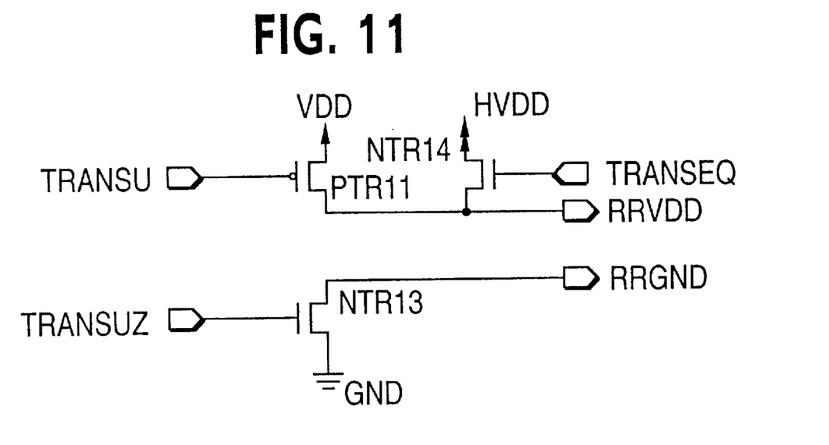
FIG. 11 is a circuit diagram showing a supply potential transfer circuit of the sixth preferred embodiment.

FIG. 11 is a circuit diagram showing a supply potential transfer circuit for the read register, according to the sixth preferred embodiment. A PMOS transistor PTR11 is connected between the voltage supply line RRVDD and the voltage source VDD. The PMOS transistor PTR11 is controlled by the control signal TRANSU. An NMOS transistor NTR14 is connected between the voltage supply line RRVDD and the voltage source HVDD. The NMOS transistor NTR14 is controlled by the equalize control signal TRANSEQ. The voltage source HVDD has a half-potential level of the voltage source VDD. An NMOS transistor NTR13 is connected between the voltage supply line RRGND and the voltage source GND. The NMOS transistor NTR13 is controlled by the control signal TRANSUZ.

Next, the operation of the sixth preferred embodiment will be explained hereinafter.

When the transfer enable signal changes from the L level to the H level, the control signal TRANSU becomes the H level and the control signal TRANSUZ becomes the L level during a certain period. The transistor PTR11 enters the OFF state when the control signal TRANSU becomes the H level. The transistor NTR13 enters the OFF state when the control signal TRANSUZ becomes the L level.

After the transistors PTR11 and NTR13 are in the OFF state, the equalize control signal TRANSEQ changes from the L level to the H level. Since the equalize control signal TRANSEQ goes to the H level, transistor NTR 14 enters the ON state. Since the transistor NTR14 enters the ON state, the potential level of the voltage supply line RRVDD changes to the ½ VDD level. This level is the threshold voltage level of the inverters INV3 and INV4. The drive capacities of the inverters INV3 and INV4 decrease because the potential level of the voltage supply line RRVDD falls to the ½ VDD level.

Next, the equalize control signal TRANSEQ changes from the H level to the L level and the data transfer signal TRANS changes from the L level to the H level. When the data transfer signal TRANS becomes the H level, the transistors NTR5, NTR6 enter the ON state. Therefore, the line 201 is electrically connected to the line 205 and the line 203 is electrically connected to the line 207.

Now, since the potential level of the voltage supply line RRVDD is about the ½ VDD level, the drive capacities of the inverters INV3, INV4 are decreased. Therefore, the potential level of the line 205 can be easily changed by the potential level of the line 201. The potential level of the line 207 can be also easily changed by the potential level of the line 203. That is, this means that the data in the write register can be written into the read register rapidly and accurately.

Next, the control signal TRANSU and the data transfer signal TRANS change from the H level to the L level and the control signal TRANSUZ changes from the L level to the H level. When the data transfer signal TRANS becomes the L level, the transistors NTR5, NTR6 enter the OFF state. Therefore, the line 201 is electrically disconnected from the line 205 and the line 203 is electrically disconnected from the line 207. When the control signal TRANSU becomes the L level, the transistor PTR11 enters the ON state. Therefore, the potential level of the voltage supply line RRVDD rises to about the VDD level. When the control signal TRANSUZ becomes the H level, the transistor NTR13 enters the ON state. Therefore, the potential level of the voltage supply line RRGND falls to about the GND level.

Since the potential level of the voltage supply line RRVDD becomes the VDD level and the potential level of the voltage supply line RRGND becomes the GND level, the state of the inverters INV3, INV4 are recovered to the normal state. Consequently, the read register can accurately latch the data transferred from the write register.

In the present invention, since the drive capacity of the read register becomes lower than that of the write register only while such data transfer operation is executed, the data transferred from the write register is not changed by the read register. Therefore, an accurate data transfer can be executed.

Furthermore, the sixth preferred embodiment has an advantage in the case where there is insufficient area between the voltage supply line RRVDD and the RRGND to produce a transistor such as the transistor NTR 12 shown in FIG. 10.

Seventh Embodiment

A semiconductor integrated circuit according to the seventh preferred embodiment will be explained hereinafter.

The difference between the seventh preferred embodiment and the sixth preferred embodiment resides in the circuit structures of the supply potential transfer circuit for the read register.

Figure 12:
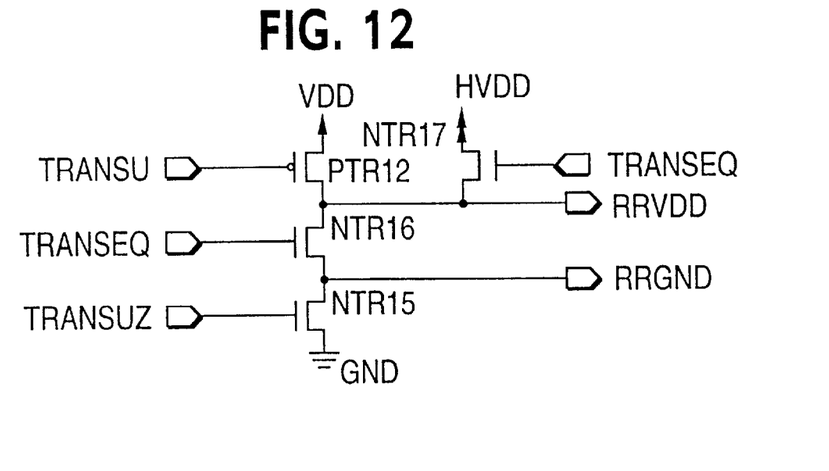
FIG. 12 is a circuit diagram showing a supply potential transfer circuit of the seventh preferred embodiment.

FIG. 12 is a circuit diagram showing a supply potential transfer circuit for the read register, according to the seventh preferred embodiment. A PMOS transistor PTR12 is connected between the voltage supply line RRVDD and the voltage source VDD. The PMOS transistor PTR12 is controlled by the control signal TRANSU. An NMOS transistor NTR17 is connected between the voltage supply line RRVDD and the voltage source HVDD. The NMOS transistor NTR17 is controlled by the equalize control signal TRANSEQ. The voltage source HVDD has a half-potential level of the voltage source VDD. An NMOS transistor NTR15 is connected between the voltage supply line RRGND and the voltage source GND. The NMOS transistor NTR15 is controlled by the control signal TRANSUZ. An NMOS transistor NTR16 is connected between the voltage supply line RRVDD and the voltage supply line RRGND. The NMOS transistor NTR16 is controlled by the equalize control signal TRANSEQ.

Next, the operation of the seventh preferred embodiment will be explained hereinafter.

When the transfer enable signal changes from the L level to the H level, the control signal TRANSU becomes the H level and the control signal TRANSUZ becomes the L level during a certain period. The transistor PTR12 enters the OFF state when the control signal TRANSU becomes the H level. The transistor NTR15 enters the OFF state when the control signal TRANSUZ becomes the L level.

After the transistors PTR12 and NTR15 are in the OFF state, the equalize control signal TRANSEQ changes from the L level to the H level. Since the equalize control signal TRANSEQ goes to the H level, the transistor NTR 16 and the transistor NTR17 enter the ON state. Since the transistors NTR16 and NTR17 enter the ON state, the potential levels of the voltage supply line RRVDD and RRGND change to the ½ VDD level. This level is the threshold voltage level of the inverters INV3 and INV4. The inverters INV3 and INV4 become a substantially inactive state because both of the potential levels of the voltage supply line RRVDD and RRGND are equal to the ½ VDD. Therefore, the drive capacities of the inverters INV3 and INV4 decrease.

Next, the equalize control signal TRANSEQ changes from the H level to the L level and the data transfer signal TRANS changes from the L level to the H level. When the data transfer signal TRANS becomes the H level, the transistors NTR5, NTR6 enter the ON state. Therefore, the line 201 is electrically connected to the line 205 and the line 203 is electrically connected to the line 207.

Now, since both of the potential levels of the voltage supply line RRVDD and RRGND are about the ½ VDD level, the inverters INV3, INV4 are in the inactive state. Therefore, the potential level of the line 205 can be easily changed by the potential level of the line 201. The potential level of the line 207 can be also easily changed by the potential level of the line 203. That is, this means that the data in the write register can be written into the read register rapidly and accurately.

Next, the control signal TRANSU and the data transfer signal TRANS change from the H level to the L level and the control signal TRANSUZ changes from the L level to the H level. When the data transfer signal TRANS becomes the L level, the transistors NTR5, NTR6 enter the OFF state.

Therefore, the line 201 is electrically disconnected from the line 205 and the line 203 is electrically disconnected from the line 207. When the control signal TRANSU becomes the L level, the transistor PTR12 enters the ON state. Therefore, the potential level of the voltage supply line RRVDD rises to about the VDD level. When the control signal TRANSUZ becomes the H level, the transistor NTR15 enters the ON state. Therefore, the potential level of the voltage supply line RRGND falls to about the GND level.

Since the potential level of the voltage supply line RRVDD becomes the VDD level and the potential level of the voltage supply line RRGND becomes the GND level, the state of the inverters INV3, INV4 are recovered to the normal state. Consequently, the read register can accurately latch the data transferred from the write register.

In the present embodiment, since the data stored in the write register is transferred to the lines 205 and 207 while the inverters INV3 and INV4 are in the inactive states, a faster data transfer can be executed.

Furthermore, in the above fifth preferred embodiment, there is a possibility that the voltage potentials of the voltage supply lines RRVDD and RRGND will not reach the exact ½ VDD level during such data transfer. In this seventh preferred embodiment, however, the voltage potentials of the voltage supply lines RRVDD and RRGND reach the exact ½ VDD level during such data transfer. Consequently, in this seventh preferred embodiment, even more accurate data transfer can be executed as compared with the fifth preferred embodiment.

Eighth Embodiment

A semiconductor integrated circuit according to the eighth preferred embodiment will be explained hereinafter. The difference between the eighth preferred embodiment and the first preferred embodiment resides in the circuit structures of the supply potential transfer circuit for the read register and the transfer control circuit.

Figure 13:
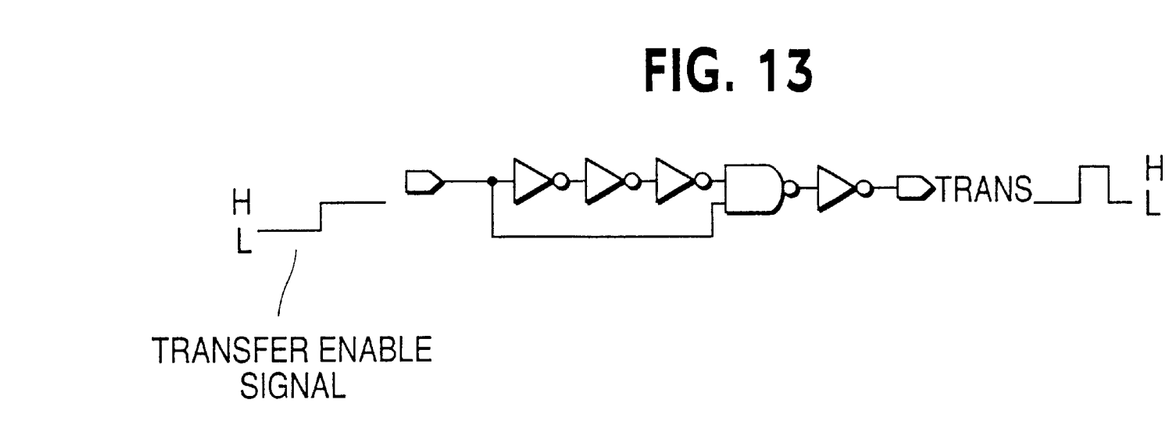
FIG. 13 is a circuit diagram showing a transfer control circuit of the eighth preferred embodiment.

FIG. 13 is a circuit diagram showing a transfer control circuit. The transfer control circuit produces the data transfer signal TRANS in response to a transfer enable signal. The transfer control circuit outputs the data transfer signal TRANS having the L level while the transfer control circuit receives the transfer enable signal having the L level. When the transfer enable signal changes from the L level to the H level, the transfer control circuit outputs the data transfer signal TRANS having the H level in accordance with the delay time which depends upon delay circuits which are comprised of a plurality of inverters as shown in FIG. 13.

Figure 14:
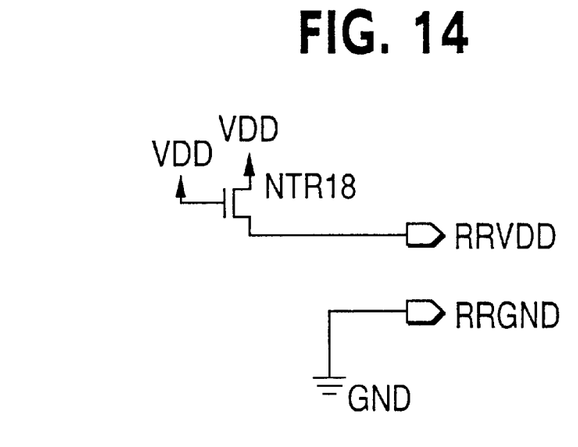
FIG. 14 is a circuit diagram showing a supply potential transfer circuit of the eighth preferred embodiment.

FIG. 14 is a circuit diagram showing a supply potential transfer circuit for the read register, according to the eighth preferred embodiment.

An NMOS transistor NTR18 is connected between the voltage supply line RRVDD and the voltage source VDD. The NMOS transistor NTR18 has a gate electrode, which is applied to the voltage source VDD level. The NMOS transistor NTR18 is normally ON type transistor. The potential level of the voltage supply line RRVDD is maintained at VDD-VT level. The VT is the threshold voltage of the transistor NTR18. The voltage supply line RRGND is directly connected to the voltage source GND for supplying the potential of 0 volts. Therefore, the potential level of the voltage supply line RRGND is always the GND level, not changed.

Next, the operation of the eighth preferred embodiment will be explained hereinafter.

When the transfer enable signal changes from the L level to the H level, the data transfer signal TRANS is the H level during a certain period. When the data transfer signal TRANS becomes the H level, the transistors NTR5, NTR6 enter the ON state. Therefore, the line 201 is electrically connected to the line 205 and the line 203 is electrically connected to the line 207.

Now, since the potential level of the voltage supply line RRVDD is the VDD-VT level, the drive capacities of the inverters INV3, INV4 are lower than those of the inverters INV1 and INV2. Therefore, the potential level of the line 205 can be easily changed by the potential level of the line 201. The potential level of the line 207 can be also easily changed by the potential level of the line 203. That is, this means that the data in the write register can be written into the read register rapidly and accurately.

Next, the data transfer signal TRANS changes from the H level to the L level. When the data transfer signal TRANS becomes the L level, the transistors NTR5, NTR6 enter the OFF state. Therefore, the line 201 is electrically disconnected from the line 205 and the line 203 is electrically disconnected from the line 207.

In the eighth preferred invention, since the potential level of the voltage supply line RRVDD is kept at a constant level which is lower than the potential level of the voltage source VDD, an accurate data transfer can be executed.

Furthermore, in the eighth preferred embodiment, the transfer control circuit can be simplified compared with other embodiments because it does not require the production of any signals other than the data transfer signal. Therefore, the total area in which the circuits are fabricated can be reduced in the chip.

In the present embodiment, since the potential level of the voltage supply line RRVDD for the read register is lower than that of the voltage source VDD during the data transfer, the drive capacity of the read register can be reduced. As a result, the data transfer from the write register to the read register can be executed without fail.

In the above preferred embodiments, an explanation is given for the case where the data is transferred from the write register to the read register (for example, a FIFO memory). However, the above technique may be applied to the case where the data is transferred from the read register to the write register (for example, a VRAM). In this case, the above preferred embodiments may be applied to the voltage supply line for the writer register.

While the preferred form of the present invention has been described, it is to be understood that modifications will be apparent to those skilled in the art without departing from the spirit of the invention.

The scope of the invention, therefore, is to be determined solely by the following claims.

What is claimed is:

1. A semiconductor integrated circuit comprising:
    a first voltage node of a first voltage level;
    a second voltage node of a second voltage level;
    a first data store circuit, coupled to said first and second voltage nodes, which stores a data;
    a second data store circuit;
    a control circuit which outputs a transfer signal and a switching signal;
    a data transfer circuit, coupled between said first data store circuit and said second data store circuit, which selectively transfers the data in said first data store circuit to said second data store circuit in response to the transfer signal;
    a first conductive line which supplies said first voltage level to said second data store circuit;
    a second conductive line which supplies said second voltage level to said second data store circuit;
    a first switch circuit, coupled between said second voltage node and said second conductive line, which selectively connects said second voltage node to said second conductive line in response to the switching signal; and
    a first resistive element coupled between said second conductive line and said first voltage node, so that a voltage level of said second conductive line gradually changes from said second voltage level toward said first voltage level after said second conductive line is disconnected from said second voltage node by said first switch circuit.

2. A semiconductor integrated circuit as set forth claim 1, further comprising a second switch circuit, coupled between said first voltage node and said second conductive line and coupled to said first resistive element in series, which selectively connects said first voltage node to said second conductive line in response to the switching signal.

3. A semiconductor integrated circuit as set forth claim 2, further comprising:
    a third switch circuit, coupled between said first voltage node and said first conductive line, which selectively connects said first voltage node to said first conductive line in response to the switching signal; and
    a second resistive element coupled between said first conductive line and said second voltage node.

4. A semiconductor integrated circuit as set forth claim 3, further comprising a fourth switching circuit, coupled between said second voltage node and said first conductive line and coupled to said second resistive element in series, which selectively connects said second voltage node to said first conductive line in response to the switching signal.

5. A semiconductor integrated circuit as set forth claim 1, wherein said control circuit outputs the switching signal in a first period and the transfer signal in a second period which is within the first period, and wherein said first switch circuit turns off in the first period and said data transfer circuit transfers the data in the second period.

6. A semiconductor integrated circuit as set forth claim 2, wherein said control circuit outputs the switching signal in a first period and the transfer signal in a second period which in within the first period, and wherein said first switch circuit turns off in the first period, said second switch circuit turns on in the first period, and said data transfer circuit transfers the data in the second period.

7. A semiconductor integrated circuit as set forth claim 3, wherein said control circuit outputs the switching signal in a first period and the transfer signal in a second period which is within the first period, and wherein said first and third switch circuits turn off in the first period and said data transfer circuit transfers the data in the second period.

8. A semiconductor integrated circuit as set forth claim 4, wherein said control circuit outputs the switching signal in a first period and the transfer signal in a second period which is within the first period, and wherein said first and third switch circuits turn off in the first period, said second and fourth switch circuits turn on in the first period, and said data transfer circuit transfers the data in the second period.

9. A semiconductor integrated circuit comprising:
    a first voltage node of a first voltage level;
    a second voltage node of a second voltage level, the second voltage level being higher than the first voltage level;
    a first conductive line;
    a second conductive line;

a first data store circuit, coupled to said first and second voltage nodes, which stores a data;

a second data store circuit coupled to said first and second conductive lines;

a first supply potential transfer circuit coupled to said second voltage node, said first voltage node and said second conductive line, which connects said second voltage node to said second conductive line in a first period and connects said first voltage node to said second conductive line in a second period which follows the first period; and a data transfer circuit, coupled between said first data store circuit and said second data store circuit, which selectively transfers the data in said first data store circuit to said second data store circuit in a third period which is within the second period.

10. A semiconductor integrated circuit as set forth claim 9, further comprising a second supply potential transfer circuit, coupled to said first voltage node, said second voltage node and said first conductive line, which connects said first voltage node to said first conductive line in the first period and connects said second voltage node to said first conductive line in the second period.

11. A semiconductor integrated circuit comprising:

a first voltage node of a first voltage level;

a second voltage node of a second voltage level;

a first conductive line;

a second conductive line;

a first data store circuit, coupled to said first and second voltage nodes, which stores a data;

a second data store circuit coupled to said first and second conductive lines;

a control circuit which outputs a transfer signal, a switching signal and a equalizing signal;

a data transfer circuit, coupled between said first data store circuit and said second data store circuit, which selectively transfers the data in said first data store circuit to said second data store circuit in response to the transfer signal;

a first switch circuit, coupled between said second voltage node and said second conductive line, which selectively connects said second voltage node to said second conductive line in response to the switching signal;

a second switch circuit, coupled between said first voltage node and said first conductive line, which selectively connects said first voltage node to said first conductive line in response to the switching signal; and a third switch circuit, coupled between said first conductive line and said second conductive line, which selectively connects said first conductive line to said second conductive line in response to the equalizing signal.

12. A semiconductor integrated circuit as set forth claim 11, wherein said control circuit outputs the switching signal in a first period, the equalizing signal in a second period which is within the first period, and the transfer signal in a third period which is within the first period and which follows the second period, and wherein said first and second switch circuits turn off in the first period, said third switch circuit turns on in the second period and said data transfer circuit transfers the data in the third period.

13. A semiconductor integrated circuit as set forth claim 11, further comprising:

a third voltage node of a third voltage level, the third voltage level being between the first voltage level and the second voltage level; and a fourth switch circuit, coupled between said third voltage node and said second conductive line, which selectively connects said third voltage node to said second conductive line in response to the equalizing signal.

14. A semiconductor integrated circuit as set forth claim 13, wherein said control circuit outputs the switching signal in a first period, the equalizing signal in a second period within the first period, and the transfer signal in a third period within the first period and which follows the second period, and wherein said first and second switch circuits turn off in the first period, said third and fourth switch circuits turn on in the second period, and said data transfer circuit transfers the data in the third period.

15. A semiconductor integrated circuit comprising:

a first voltage node of a first voltage level;

a second voltage node of a second voltage level;

a third voltage node of a third voltage level, the third voltage level being between the first voltage level and the second voltage level;

a first conductive line;

a second conductive line;

a first data store circuit, coupled to said first and second voltage nodes, which stores a data;

a second data store circuit coupled to said first and second conductive lines;

a control circuit which outputs a transfer signal, first and second switching signals;

a data transfer circuit, coupled between said first data store circuit and said second data store circuit, which selectively transfers the data in said first data store circuit to said second data store circuit in response to the transfer signal;

a first switch circuit, coupled between said second voltage node and said second conductive line, which selectively connects said second voltage node to said second conductive line in response to the first switching signal;

a second switch circuit, coupled between said first voltage node and said first conductive line, which selectively connects said first voltage node said first conductive line in response to the first switching signal; and a third switch circuit, coupled between said third voltage node and said second conductive line, which selectively connects said third voltage node to said second conductive line in response to the second switching signal.

16. A semiconductor integrated circuit as set forth claim 15, wherein said control circuit outputs the first switching signal in a first period, the second switching signal in a second period within the first period, and the transfer signal in a third period which is in the first period and which follows the second period, and wherein said first and second switch circuits turn off in the first period, said third switch circuit turns on in the second period, and said data transfer circuit transfers the data in the third period.

17. A semiconductor integrated circuit as set forth claim 15, further comprising a fourth switch circuit, coupled between said first conductive line and said second conductive line, which selectively connects said first conductive line to said second conductive line in response to the second switching signal.

18. A semiconductor integrated circuit as set forth claim 17, wherein said control circuit outputs the first switching signal in a first period, the second switching signal in a second period within the first period, and the transfer signal in a third period which is within the first period and which follows the second period, and wherein said first and second switch circuits turn off in the first period, said third and fourth switch circuits turn on in the second period, and said data transfer circuit transfers the data in the third period.

19. A semiconductor memory device comprising:

a first voltage node of a first voltage level;

a second voltage node of a second voltage level, the second voltage level being higher than the first voltage level;

a first conductive line coupled to said first voltage node;

a second conductive line;

a first data store circuit coupled to said first and second voltage nodes, and which stores a data;

a second data store circuit coupled to said first and second conductive lines;

a supply potential transfer circuit, coupled between said second voltage node and said second conductive line, which maintains the voltage level of said second conductive line to a third voltage level, the third voltage level being between the first voltage level and the second voltage level; and a data transfer circuit, coupled between said first data store circuit and said second data store circuit, which selectively transfers the data in said first data store circuit to said second data store circuit.

20. A semiconductor integrated circuit as set forth claim 19, wherein said supply potential transfer circuit comprises a transistor having a gate electrode connected to said second voltage node, a source electrode connected to said second voltage node and a drain electrode connected to said second conductive line.

21. A semiconductor integrated circuit as set forth claim 20, said transistor is a normally on type transistor.

* * * * *